Sept. 5, 1933.    A. R. KELLER    1,925,730
STRAINER TANK
Filed Aug. 19, 1932    4 Sheets-Sheet 4
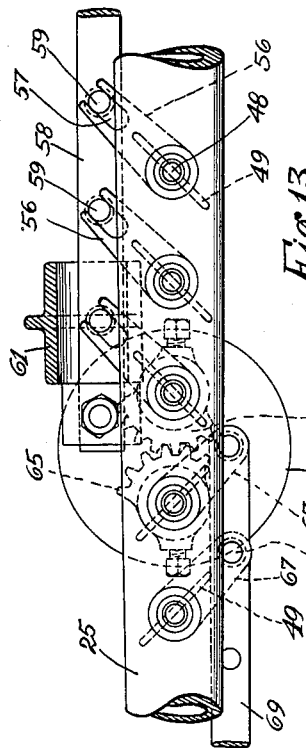
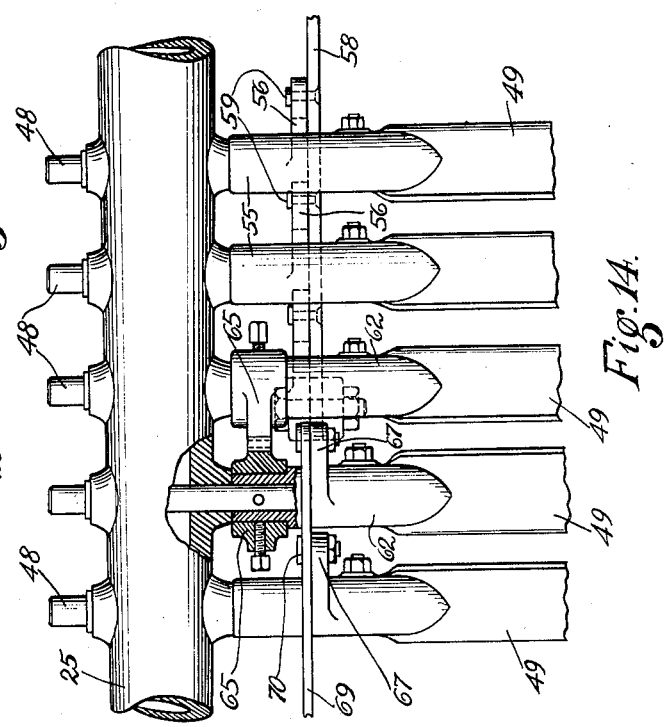
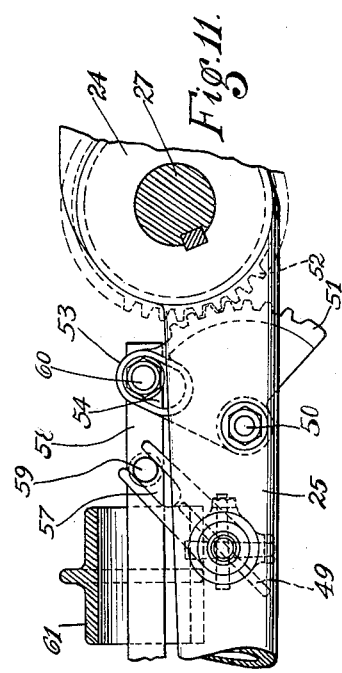
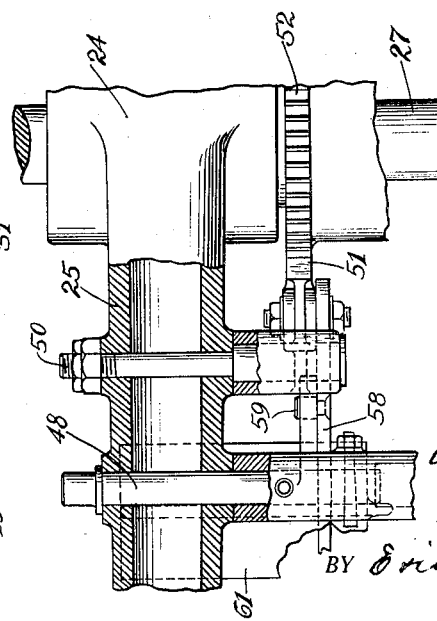
INVENTOR.
Andreas R. Keller
BY Erich H. Michaelis
ATTORNEY.

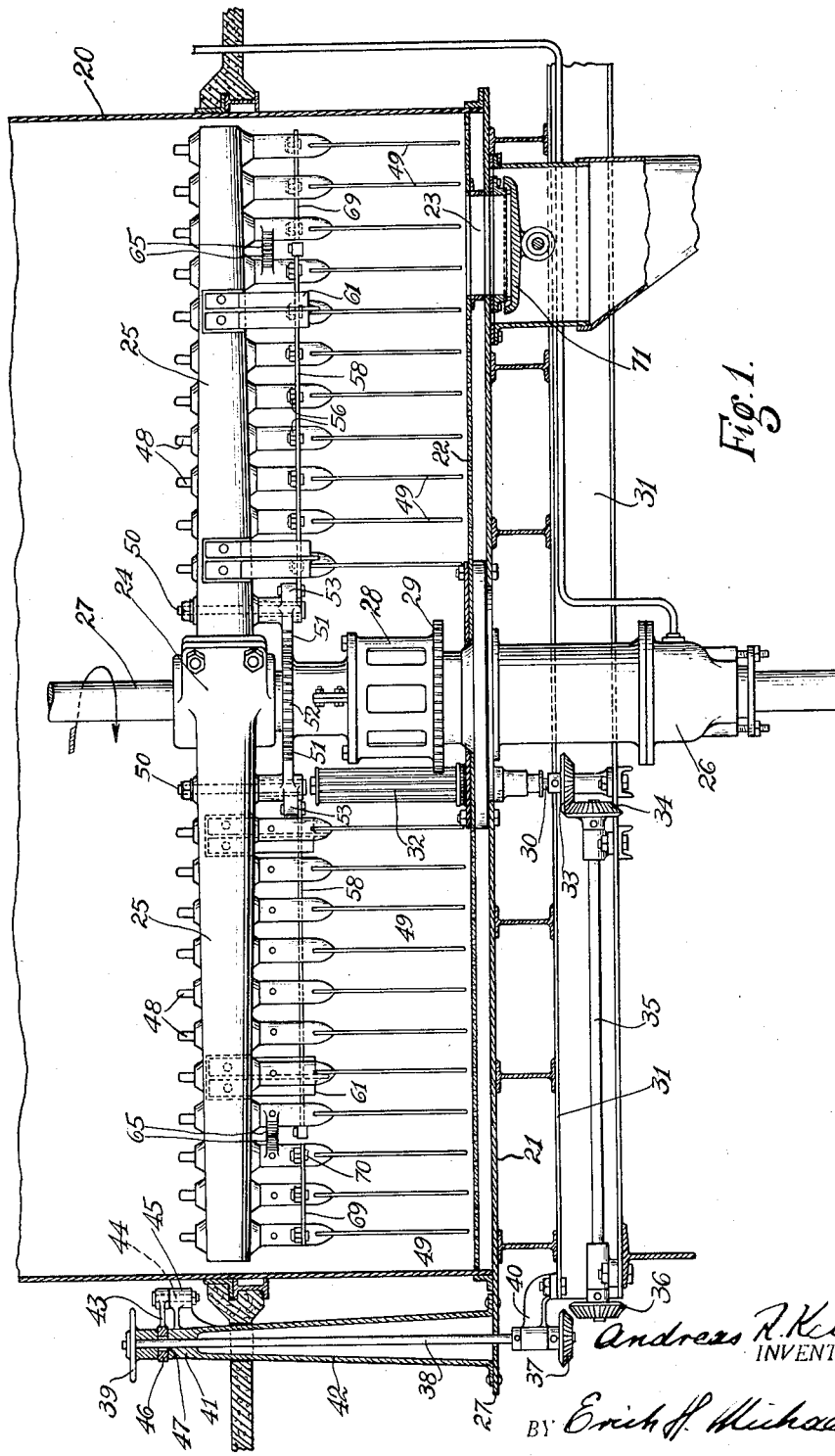

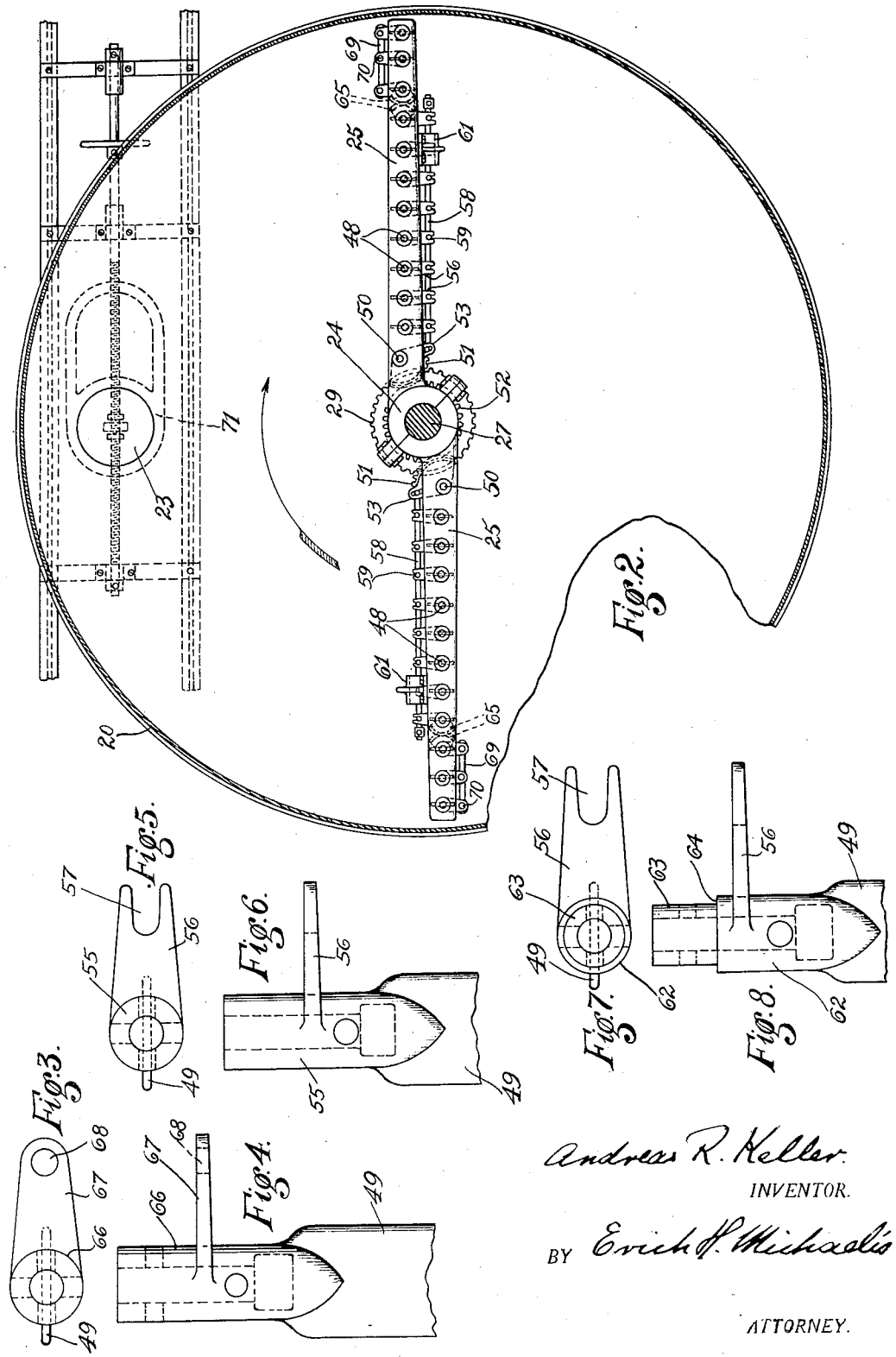

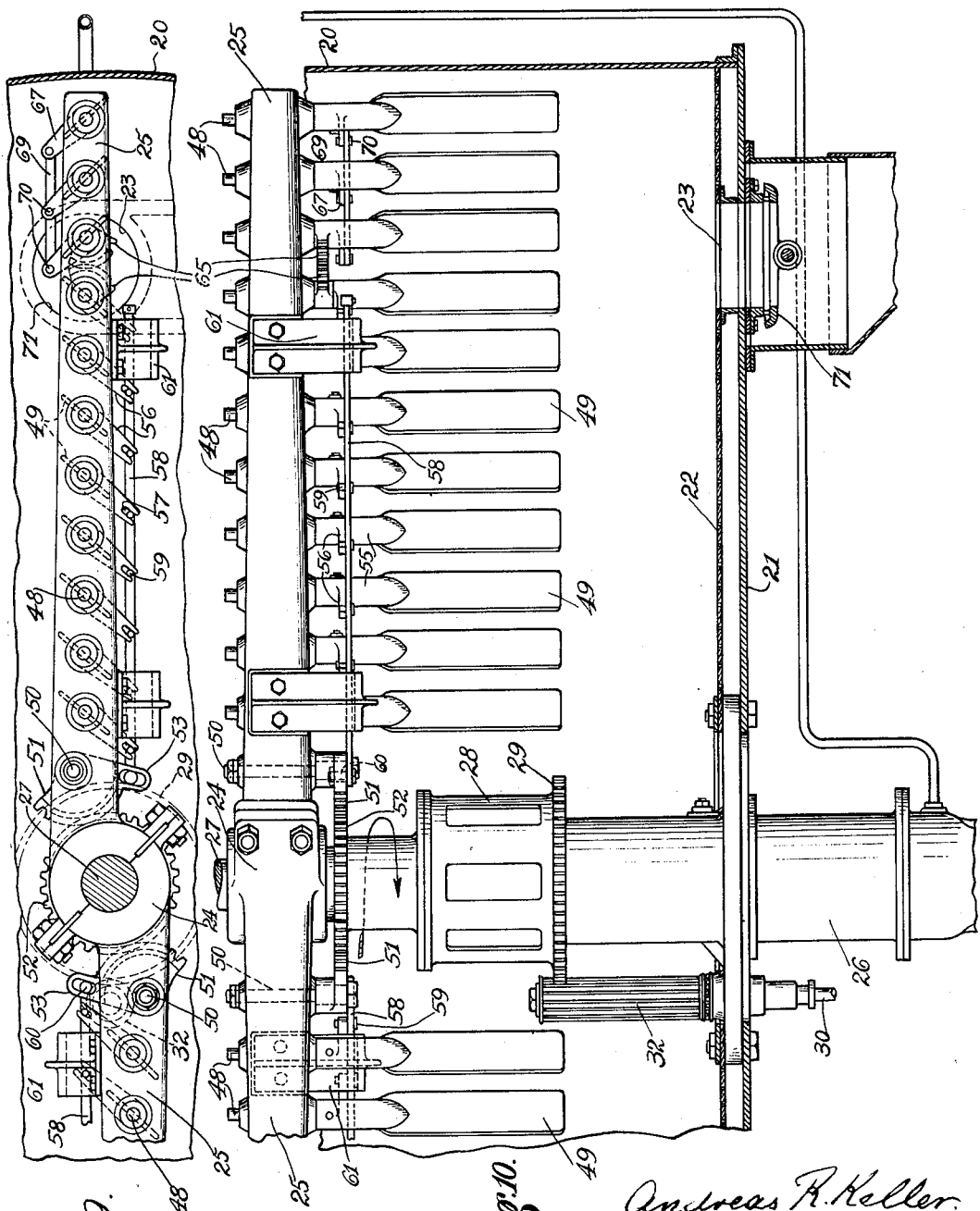

Patented Sept. 5, 1933

1,925,730

UNITED STATES PATENT OFFICE 1,925,730

STRAINER TANK

Andreas R. Keller, Lombard, Ill.

Application August 19, 1932. Serial No. 629,500

4 Claims. (Cl. 210—151)

The invention relates to strainer tanks of the type used for clearing fluids, and more especially the invention relates to strainer and automatic grain removing blades used in strainer tanks. It is well known to arrange a spider having a plurality of arms rotatably in a strainer tank and to attach adjustably on each spider arm a plurality of blades. The whole spider is then adapted to be raised and lowered in said tank. When a fluid is to be strained, such as for instance a brew, the heavy portions, which are to be removed from the fluid, will settle on the bottom of the tank and in order to enable the liquid proper to penetrate the settling on the bottom of the tank, the spider is lowered until the blades nearly touch the bottom of the tank. The blades are adjusted to extend approximately parallel to the circumference of the tank and the spider is rotated whereby the blades will cut circular grooves in the settling so, that the fluid portion of the brew will then penetrate the settling and will drain off on the bottom.

After the liquid part is drained off, the settling or the remaining grain must be removed from the tank, and for that purpose an opening is provided and it is common practice to use the blades to force the grain toward said openings. This is done by raising the spider above the settling and by angularly adjusting the blades so, that the grain will be pushed toward the opening in the bottom of the tank, when the spider is rotated and at the same time lowered so, that the blades will slowly be immerged into the settling and will force the same toward the opening in the bottom of the tank. In order to adjust the blades angularly in either grain removing position or into straining position, it was heretofore necessary to reach into the tank.

The object of the invention therefore is to provide means for adjusting these blades from the outside of the tank.

Another object of the invention is to connect the blades attached to each spider arm so, that all these blades will be adjusted simultaneously.

A further object of the invention is to provide means for adjusting the blades of one spider arm simultaneously so, that those blades, which are located inwardly of the grain hole in the bottom of the tank will force the grain toward the periphery of the tank and the blades located outwardly of said hole will force said grain away from the outward wall of the tank toward the drain hole.

Other objects of the invention not specifically mentioned may be easily ascertained and understood from the following description in connection with the accompanying drawings forming a part thereof. It is however to be understood, that the invention is not to be limited or restricted to the exact construction and formation shown in the drawings and described in the specification, but that said invention is only to be limited by the scope of the claims appended hereto.

In the drawings illustrating a preferred embodiment of the invention:

Fig. 1 is a diagonal section through a strainer tank provided with a spider on which adjustable blades are attached, said spider being adapted to be raised and lowered in said tank and to be rotated in any one of said adjustments. The blades are shown in strainer position, Fig. 2 is a horizontal sectional view of the tank taken above the spider, Fig. 3 is a top view of one of the blades located between the outside wall of the tank and the drain hole, which is provided in the bottom of the tank, Fig. 4 is a side view of such blade, Fig. 5 is a top view of one of the blades located between the axis of the tank and the drain hole, Fig. 6 is a partial side view of the blade illustrated in Fig. 5, Fig. 7 is a top view of one of the blades next to the drain hole, Fig. 8 is a side view of said blade, Fig. 9 is a top view of a spider carrying blades arranged in grain removing position, Fig. 10 is a diagonal sectional view of a strainer tank showing the spider in raised position and the arms thereon in grain removing position.

Fig. 11 is a detail of the blade adjusting mechanism,

Fig. 12 is a side view of Fig. 11 partly shown in section,

Fig. 13 is another detail of the blade adjusting mechanism, and

Fig. 14 is a side view of Fig. 13 also partly shown in section.

A strainer tank 20 is provided with a bottom 21. At a distance from this bottom and above the same a sieve bottom 22 is arranged, permitting liquid to drain into the space between the two bottoms. From this space the liquid may then be conducted by any suitable means (not shown) to any desired place. A drain hole 23 is provided in both bottoms. A spider 24 is provided with a plurality of spider arms 25.

The spider arm and any parts connected therewith are adapted to be raised and lowered, and preferably this operation is performed by hydraulic pressure and the apparatus for this purpose is indicated at 26 in the drawings. In order to rotate the spider and the parts connected therewith, the spider is fastened to a vertical shaft 27, which may be rotated by any suitable means (not shown). A housing 28 is rotatably, but not slidably mounted on the shaft, and is raised and lowered together with the spider when the latter is moved upwardly or downwardly by increasing or decreasing the hydraulic pressure.

A spur gear 29 is either rigidly fastened to the housing or forms an integral part thereof. A vertical shaft 30 extends through the two bottoms of the tank and is rotatably journalled therein and in the means 31 supporting the tank. An elongated pinion 32 is rigidly mounted on the vertical shaft 30, and meshes permanently with the spur gear 29 on the housing 28. The pinion 32 is high enough that the two gears will never be out of mesh, no matter if the spider is raised to its uppermost position or let down to its lowermost position. On the lower part of the shaft 30 a bevel gear 33 is rigidly mounted, which meshes with a second bevel gear 34 on a horizontal shaft 35. This shaft is rotatably supported by the steel construction 31. On the end opposite to the bevel gear 34, another bevel gear 36 is rigidly mounted on the shaft 35, and this bevel gear meshes with a bevel gear 37 on a vertical shaft 38, which may be rotated by any suitable means, for instance as indicated in Fig. 1 by means of a hand wheel 39 on the vertical shaft 38. This shaft is rotatably journalled in a bracket 40 fastened to the steel construction 31 supporting the tank, and in a bearing 41 supported by a standard 42 resting also on the sub-structure 31. The vertical shaft 38 is slidingly arranged in its bearings, and a lever 43 is rotatably mounted on a shaft 44, arranged and supported in a bracket 45 forming a part of the standard 42. The free end of the lever 43 is provided with a ring 46, having a radial slot 47 therein. The shaft 38 may be lifted upwardly so, that the ring 46 may then be located on top of the standard 42 and the bearing 41 so, that it will be located between the hand wheel 39 and said bearing. This is done by swinging the lever 43 into the position shown in Fig. 1. When the parts are arranged in this manner, the bevel gear 47 is out of engagement with the bevel gear 36. In order to put the bevel gears 37 and 36 into mesh, it is only necessary to swing the lever 43 away from the bearing 41, so that the shaft 38 will slide downwardly in its bearings.

Each spider arm 25 is provided with a plurality of vertical holes in each of which a short shaft 48 is rotatably arranged. A blade 49 is rigidly, but removably fastened to each short shaft. In the holes and the spider arms next to the main shaft 27, a short pin 50 is rotatably mounted, and at its adjacent lower end an arcuate gear 51 is fastened to said pin. On the upper end of the housing 28, a gear 52 is formed meshing with the arcuate gears 51. In addition to the arcuate gear 51 a lever 53 is rigidly mounted on the pin 50, and is provided adjacent its outer end with a slot 54, as best seen in Fig. 11.

All blades 49, which are located inwardly between the center of the tank and the drain hole 23, are provided with a sleeve 55 at its upper end, adapted to receive one of the short vertical shafts 48, which may be held in position by any suitable means. On each sleeve 55 a lever arm 56 is provided, having at its outer end a longitudinal slot 57. A connecting bar 58 is provided with a plurality of lugs 59, and on one at its ends with a stud 60, which engages the slot 54 in the lever 53. Each lug 59 engages one of the slots 57 in the lever arms 56. On the spider arms 25 guide boxes 61 are provided for the connecting bars 58.

The two blades 49 located next to the center of the drain hole 23, are also provided at their upper ends with sleeves 62, which are adapted to receive one of the short shaft 48. They also are provided with lever arms 56, having end slots 57 therein. The upper parts of these sleeves 62 have a portion 63, of a somewhat smaller outside diameter, so that a shoulder 64 is formed on said sleeve, and arcuate gear 65 is removably fastened to each of the two reduced portions of the sleeves 62, and these arcuate gears mesh with each other. All blades 49 located between the outer blade carrying one of the arcuate gear 65 and the wall of the tank, are also provided with a sleeve 66, adapted to receive a short shaft 48, and having a lever arm 67, in which a hole 68 is provided. A short connecting bar 69 is fastened to the lever arms 67 by means of studs 70, which extend rotatably through holes in the short connecting bar 69.

A cover 71 is provided for the drain hole 23, and may be moved into and out of closing position, by any suitable means.

The invention operates as follows:

When the tank is filled with a brew and the heavier portion, that means the grain is settling in the bottom of the tank, and forming a so-called cake therein, the spider is raised to its uppermost position, and then the supporting lever 43 is removed out of the position, shown in Fig. 1. The vertical shaft 32 slides downwardly, and the gear 37 engages the gear 36. The hand wheel 39 is then rotated until all blades are arranged in the position shown in Figs. 1 and 2, that means practically parallel to the circumferential wall of the tank. The spider is then set in rotary motion, and is permitted to sink downwardly in the tank by decreasing the hydraulic pressure. In this manner, circular grooves are cut into the cake, formed by the settling grain, so that the liquid contents of the brew may enter into these grooves, and seep through the cake, thereby taking all the desirable portions out of the grain. After all the liquid has been drained off, and nothing but the heavy settling is left in the tank, the spider is raised again to its uppermost position, and the cover of the drain hole 23 is arranged into open position, when the hand wheel is rotated again, so that the connecting train will be actuated. This train consists of the vertical shaft 38, the two meshing gears 37 and 36, the horizontal shaft 35, the bevel gears 34 and 33, the vertical shaft 30, the long pinion 32, the spur gear 29, housing 28, the spur gear 52, the arcuate gears 51, the levers 53, the connecting rods 58, the levers 56, the arcuate gears 65, the levers 56 and 67, and the connecting rods 69. By operating the hand wheel all plates 49 are rotated about the axis of the corresponding sleeves so, that the blades, located between the axis of the tank, and the axis of a drain hole, will force the settling towards the drain hole, when the spider is being rotated and permitted to sink into the cake. While the blades located between the wall of the tank and the axis of the drain hole, will shove the settling away from the wall towards the drain hole.

While the brew is being worked in the tank by means of rotating the spider to stir the mesh, the vertical shaft 38 is lifted up so, that the bevel gear 37 will be out of engagement with the gear 36, and the supporting lever 46 will be arranged in the position, shown in Fig. 1, holding the two gears out of engagement.

Having described my invention and how the same is to be performed, I claim as new and desire to secure by Letters Patent:

1. In a device of the class described in combination with a tank, a spider having a plurality of arms and mounted rotatably in said tank, a plurality of plates rotatably mounted on each spider arm and extending downwardly therefrom, a lever connected with each plate, a bar, means for hingedly connecting each lever to said bar, a pin rotatably mounted in each spider arm and extending vertically thereof, a lever rigidly mounted on said pin and hingedly connected with the connecting bar, an arcuate gear rigidly mounted on said pin, a vertical shaft for the spider a gear rotatably mounted on said shaft, and meshing with the arcuate gear, a second gear rigidly connected with said first gear and rotatably mounted on the shaft, a second vertical shaft extending through the bottom of the tank, an elongated pinion rigidly mounted on the second shaft and permanently meshing with the second gear, a horizontal shaft rotatably mounted underneath the tank, a bevel gear rigidly mounted on the lower end of the second vertical shaft, another bevel gear meshing with the first one and rigidly fastened on the horizontal shaft, a third bevel gear on the other end of the horizontal shaft, a third vertical shaft rotatably supported outside of the tank, a bevel gear on the lower end of the last mentioned vertical shaft, a hand wheel rigidly mounted on the other end of said shaft, and means arranged outside of the tank of disengaging the two last-named bevel gears from each other.

2. In a device of the class described in combination with a tank, a spider having a plurality of arms, a plurality of blades rotatably mounted in each spider arm and extending downwardly thereof, a lever rigidly connected with each blade, a bar, means for hingedly connecting each lever to the bar, a central shaft for the spider a pin rotatably mounted in each spider arm, adjacent the central shaft and extending vertically, an arcuate gear on the lower end of said pin, a lever on said pin and hingedly connected with the end of the bar, a gear rotatably mounted on the central shaft and meshing with the arcuate gear, a second gear rigidly connected with said first gear and rotatably mounted on the central shaft, a vertical shaft extending through the bottom of the tank, an elongated pinion rigidly mounted on said vertical shaft and in permanent mesh with the second gear, a bevel gear on the lower end of the vertical shaft, a horizontal shaft rotatably mounted underneath the tank, a second bevel gear on one end of the horizontal shaft and meshing with the first bevel gear, another bevel gear on the other end of the horizontal shaft, a vertical shaft rotatably and slidably journalled outside of said tank, a bevel gear adapted to engage the second bevel gear on the horizontal shaft, a hand wheel on the other end of the last mentioned vertical shaft and means for securing the vertical shaft in its position, after said shaft has been slid upwardly.

3. In a device of the class described in combination with a tank, a spider, having a plurality of spider arms and rotatably mounted in said tank, a plurality of plates pivotally mounted on each spider arm and extending downwardly therefrom, a lever rigidly connected with each plate, a bar, means for hingedly connecting some of said levers to said bar, a second bar, means for hingedly connecting the remaining levers to the second bar, a gear rigidly fastened to each of the adjacent plates of the two groups said two gears meshing with each other, and means for reciprocally moving one of said bars, said means being arranged on the outside of said tank.

4. In a device of the class described in combination with a tank, a spider, rotatably mounted in said tank and having a plurality of spider arms, a central shaft for said spider arm a plurality of plates rotatably mounted on each spider arm, and extending downwardly therefrom, a lever on each plate, an adjusting bar, means for hingedly connecting adjacent levers to said bar, a second bar, means for connecting the remaining levers hingedly to said second bar, a gear fastened to each of the adjacent levers of said two groups, a pin rotatably extending through the spider arm next to the central shaft, a lever rigidly mounted on said pin and hingedly connected to one of said bars a gear rigidly mounted on said pin, a gear rotatably mounted on said central shaft and rigidly connected with the first gear on said shaft and meshing with the first gear, another gear fast on said central shaft, a vertical shaft extending through the bottom of the tank, an elongated pinion permanently meshing with the second gear on the central shaft, a bevel gear on the lower end of the vertical shaft, a horizontal shaft rotatably mounted underneath said tank a bevel gear mounted on one end of horizontal shaft and meshing with the first bevel gear, a second bevel gear fast on the other end of the horizontal shaft, a vertical shaft rotatably mounted outside of the tank, a bevel gear on the lower end of said shaft, and adapted to mesh with the second bevel gear on the horizontal shaft, and a hand wheel of the other end of the vertical shaft.

ANDREAS R. KELLER.